(12) United States Patent
Ebner et al.

(10) Patent No.: US 7,799,397 B2
(45) Date of Patent: Sep. 21, 2010

(54) PRESSURE PIPES

(75) Inventors: Karl Ebner, Rohr (AT); Juergen Emig, Weiz (AT); Franz Ruemer, St. Georgen/Gusen (AT)

(73) Assignee: Borealis Technology Oy, Porvoo (FI)

( * ) Notice: Subject to any disclaimer, the term of this patent is extended or adjusted under 35 U.S.C. 154(b) by 35 days.

(21) Appl. No.: 10/495,539

(22) PCT Filed: Nov. 6, 2002

(86) PCT No.: PCT/EP02/12368

§ 371 (c)(1), (2), (4) Date: Jul. 13, 2004

(87) PCT Pub. No.: WO03/042260

PCT Pub. Date: May 22, 2003

(65) Prior Publication Data

US 2005/0053741 A1    Mar. 10, 2005

(30) Foreign Application Priority Data

Nov. 14, 2001 (EP) .................................. 01127005

(51) Int. Cl.
*B32B 1/08* (2006.01)
*B32B 27/00* (2006.01)

(52) U.S. Cl. ..................... 428/35.7; 428/34.1; 428/35.9; 428/36.9; 428/36.91; 428/500

(58) Field of Classification Search ................ 428/34.1, 428/35.9, 36.9, 36.91, 500
See application file for complete search history.

(56) References Cited

U.S. PATENT DOCUMENTS

| 4,719,257 | A | * | 1/1988 | Ishii et al. ................... 524/108 |
| 5,310,584 | A | * | 5/1994 | Jacoby et al. .................. 428/2 |
| 6,110,547 | A |   | 8/2000 | Sano et al. ..................... 428/31 |
| 6,300,420 | B1 |  | 10/2001 | Jaaskelaeinen et al. ...... 525/240 |
| 6,362,298 | B2 |  | 3/2002 | Dolle et al. .................. 526/348 |
| 6,503,993 | B1 |  | 1/2003 | Huovinen et al. ......... 526/348.1 |
| 6,881,446 | B2 |  | 4/2005 | Hennig ....................... 427/251 |
| 2003/0008091 | A1 | | 1/2003 | Konrad et al. .............. 428/36.9 |

FOREIGN PATENT DOCUMENTS

| AT | 404294 | 10/1998 |
| DE | 3319515 | 11/1984 |
| EP | 0 177 961 | 4/1986 |
| EP | 0 557 721 A2 | 9/1993 |
| EP | 0791609 | 8/1997 |

(Continued)

OTHER PUBLICATIONS

1996, Chapter 1. Items 3.3., Polymorphic Forms of Isotactic PP and 6.3., Influences on End-Use Properties, Edward P. Moore. Jr., Polypropylene Handbook, pp. 1-10, 134-138 and 240-246.

(Continued)

*Primary Examiner*—Marc A Patterson
(74) *Attorney, Agent, or Firm*—Jordan and Hamburg LLP (57) ABSTRACT

A pressure pipe with increased long-term pressure resistance is comprised of a polypropylene composition. The polypropylene composition is comprised of a polyproyplene copolymer which is at least partially crystallised in the β-modification.

15 Claims, 1 Drawing Sheet

FOREIGN PATENT DOCUMENTS

| | | |
|---|---|---|
| EP | 1260528 | 11/2002 |
| EP | 1260545 | 11/2002 |
| EP | 1260546 | 11/2002 |
| EP | 1260547 | 11/2002 |
| JP | 5-170932 | 7/1993 |
| JP | 05170932 | 7/1993 |
| JP | 7-126409 | 5/1995 |
| JP | 9-235328 | 9/1997 |
| JP | 10-506952 | 7/1998 |
| JP | 10-278067 | 10/1998 |
| JP | 2001-233923 | 8/2001 |
| JP | 2001-522904 | 11/2001 |
| WO | WO 9611216 | 4/1996 |
| WO | WO 9624623 | 8/1996 |
| WO | WO 97/33116 | 9/1997 |
| WO | WO 97/33117 | 9/1997 |
| WO | WO 9924479 | 5/1999 |
| WO | WO 02077315 | 10/2002 |

OTHER PUBLICATIONS

1998, Chapter 1, Items 2. Morphology and Commercial Form, 12.3.2, Distinction between homopolymer, random copolymer, block copolymer, 16.1.6, Pipe and tube extrusion, Clive Maier and Teresa Calafut, Polypropylene, The Definitive User's Guide and Databook, pp. 1-6, 8-25, 136-138 and 218-221.

* cited by examiner

PRESSURE PIPES

FIELD OF THE INVENTION

The invention relates to a pressure pipe with increased long-term pressure resistance which is comprised of a polypropylene composition.

BACKGROUND OF THE INVENTION

Polymer materials are frequently used for pipes for various purposes, such as fluid transport, i.e. transport of liquid or gas, e.g. water or natural gas, during which the fluid can be pressurized. Moreover, the transported fluid may have varying temperatures, usually within the temperature range of about 0° C. to about 70° C. Such pipes are preferably made of polyolefins, usually polyethylene or polypropylene.

Because of the high temperatures involved, hot water pipes of polymer materials represent a particularly problematic type of polymer pipe. Not only must a hot water polymer pipe fulfill the requirements necessary for other ordinary polymer pipes, such as cold water pipes, but in addition it must withstand the strain associated with hot water. The temperatures of the hot water in a hot water pipe, typically used for plumbing and heating purposes, range from 30-70° C. which means that the pipe must be able to withstand a higher temperature than that for a secure long term use. Peak temperatures may be as high as 100° C.

According to the draft standard prEN 12202 a hot water polypropylene pipe must meet the requirement of at least 1000 h before failure at 95° C. and 3.5 MPa pressure if it is a random copolymer.

The Austrian patent AT 404 294 B discloses a pressure pipe which consists of a homopolymer of polypropylene which consists predominantly of the hexagonal β-form of polypropylene with a nucleating agent which is based on an amide. These pipes have an increased resistance to rapid crack propagation.

The published Japanese patent application JP 05-170932 discloses polypropylene pipes for watersupply purposes. It is disclosed, that by adding certain anti-oxidants to different kinds of polypropylene, the endurance time of these pipes can be increased.

None of these documents discloses polypropylene pipes with an increased long-term pressure resistance.

OBJECT OF THE INVENTION

It is therefore the object of the present invention to provide pressure pipes with an increased long-term pressure resistance which are comprised of a polypropylene composition.

This object has been solved by a polypropylene composition which is comprised of a propylene copolymer which comprises 73.0 -99.0 wt % of propylene and 1 to 20 wt % of one or more $C_4$-$C_8$ α-olefins and/or up to 7 wt % of ethylene, where the propylene copolymer is at least partially crystallized in the β-modification.

Long-term pressure resistance herein means a late occurrance of a knee-point when the pipe is tested according to ISO 1167:1996(E). Late means, that the occurance of a knee-point is shifted to a considerably higher failure time as for conventional polypropylene pipes. A late occurrance of a knee-point also usually encompasses that the slope of a regression line connecting the ductile failure points, in a log-log diagram, is flatter than compared with present art.

Descriptions of ductile failure, brittle failure and knee-point (at a given temperature): A ductile failure is defined as a macroscopically visible deformation of the pipe geometry, e.g. a ruptured bubble. A brittle failure or a weeping failure, which both are in the following referred to as non-ductile (n.d.), is defined as a failure which does not result in a visible deformation of the pipe geometry, e.g. cracks, fissures. A weeping failure typically has such a small crack, that it needs to be visually inspected to see water penetrating out of the pipe wall. Brittle failures are detected by pressure loss in the pipe pressurising equipment. A knee-point at a given temperature is defined as the intersection of the regression line representing the ductile failures and the regression line representing the non-ductile failures.

In order to calculate the lifetime of a pipe at longer times, pipes need to be pressure tested at different temperatures according to ISO 1167. Pressure test results at higher temperatures, e.g. at 110° C. or 95° C., allow to extrapolate the life time of the pipe to lower temperatures. The extrapolation procedure is described in detail in the ISO TR 9080 (1992) standard, commonly referred to as the standard extrapolatin method (SEM). This calculation method, which was defined for plastics pipes, fits a regression line in all the ductile breaks for a given test temperature and a second regression line in the non-ductile breaks of this given temperature. The non-ductile lines are always steeper than the ductile lines. The calculation method is based on the combination of the set of failure data, where at a given temperature pipes are tested at different stress levels to get different failure times. Also pipes which are still "in progress", i.e. no pipe failure has been observed and the time under test at a given time and stress is known, may also be added to the set of data. This is particularly valid for pipes still under test at longer test times. Extrapolation time limits are also defined in this standard, e.g. when test results are available at 95° C. up to one year, these test results are allowed to be extrapolated to 55° C. (i.e. 95 minus 40) at 50 years. 50 years of extrapolation are relevant for building pipes, but also shorter times such as 10 to 20 years of extrapolation are relevant, e.g. for pipes for industrial use. The slopes of the lines of the non-ductile failures are steeper (i.e. more negative) than that of the ductile failures (when the same log(failure time) vs. log(hoop stress) diagram is used as given in FIG. 1). Since the point where the knee-point occurs, greatly influences the extrapolated stress at a given temperature, typically chosen between 30 to 70° C., with extrapolated lifetimes from 10 to 50 years, it is desireable for the knee-point to be at long times. The claim of the invention is that the knee-point at a given temperature of the new product is shifted to longer times compared to present art.

It is also possible, when testing a pipe at a higher temperature such as 95° C., that a knee-point is not observed within an investigation time of 1 year, which is in fact a particularly preferred behaviour. In such a case it is possible to use only ductile failures for extrapolation of longer times.

The slope of the regression line of the ductile failure points has a large influence on the extrapolated life times. It is therefore desireable for this slope for a given temperature to be as large as possible, i.e the regression line shall be as "flat" as possible ("large", because in the display format of FIG. 1 the slopes are negative values). It is part of the present invention, that the extrapolation line linking the ductile failure points for a given temperature is flatter than present art.

It has surprisingly been found that pressure pipes which are comprised of the above composition exhibit a remarkably improved behaviour where long-term pressure resistance is concerned.

The polypropylene composition of this invention is a composition of a copolymer of propylene with ethylene and/or an α-olefin.

This polypropylene copolymer is a copolymer which contains 73.0 to 99.0 wt %, preferably 83.0-99.0 wt %, more preferably 85.5-97.0 wt % of propylene and 1 to 20 wt %, preferably 1.0-12.0 wt %, more preferably 3.0-10.0 wt % of one or more $C_4$-$C_8$ α-olefins and/or up to 7.0 wt %, preferably up to 5.0 wt % and more preferably up to 4.5 wt % of ethylene.

The $C_4$-$C_8$ α-olefin is preferably selected from 1-butene, 1-pentene, 1-hexene, 4-methyl-1-pentene and 1-octene. Particularly preferred is 1-butene The polymerisation process for the production of the polypropylene copolymer may be a continuous process or a batch process, utilizing known methods and operating in liquid phase, optionally in the presence of an inert diluent, or in gas phase, or by mixed liquid-gas techniques. The process is preferably carried out in the presence of a stereospecific Ziegler-Natta- or metallocene-catalyst system. The copolymer includes polypropylene copolymers with a monomodal as well as polypropylene copolymers with a bimodal or multi-modal molecular weight distribution.

The "modality" of a polymer refers to the shape of its molecular weight distribution curve, i.e. the appearance of the graph of the polymer weight fraction as function of its molecular weight. If the polymer is produced in a sequential step process, utilizing reactors coupled in series and using different conditions in each reactor, the different fractions produced in the different reactors will each have their own molecular weight distribution. When the molecular weight distribution curves from these fractions are superimposed into the molecular weight distribution curve for the total resulting polymer product, that curve will show two or more maxima or at least be distinctly broadened in comparison with the curves for the individual fractions. The molecular weight distribution of such a polymer product, produced in two or more serial steps, is called bimodal or multimodal, depending on the number of steps.

According to a further embodiment the pipe is comprised of a propylene copolymer which is comprised of
83.0-99.0 wt % of propylene and
1 to 12 wt % of one or more $C_4$-$C_8$ α-olefins and/or up to 5.0 wt % of ethylene.

Pipes from these polypropylene compositions exhibit still better long-term pressure resistances.

According to the present invention the polypropylene composition has an MFR of 0.1 to 10 g/10 min at 230° C./2.16 kg. Preferred MFR values 0.1 to 5, more preferably 0.1 to 2, and most preferably MFR values below 1 g/10 min at 230° C./2.16 kg.

According to a still further embodiment of the present invention the propylene copolymer is a random polymer.

It is advantageous for the pipes according to the invention when the amount of β-crystallinity of the polypropylene copolymer (determined by DSC using the second heat) is at least 50%, preferably at least 60%, more preferably at least 70% and most preferably at least 80%.

According to an advantageous embodiment the propylene copolymer comprises a β-nucleating agent, of which any one or mixtures of a mixed crystal of 5,12-dihydro-quino(2,3-b) acridine-7,14-dione with quino(2,3-b)acridine-6,7,13,1 4(5H, 1 2H)-tetrone, N,N'-dicyclohexyl-2,6-naphtalen dicarboxamide and salts of dicarboxylic acids with at least 7 carbon atoms with metals of group 11 of the periodic table are preferred.

A preferred composition is comprised of a propylene copolymer which is comprised of
89.0-96.0 wt % of propylene and
3 to 10 wt % of butene and up to
1.0 wt % of ethylene.

It is a further object of the present invention to provide a novel way of producing polypropylene pressure pipes with a reduced sensitivity of the measured failure times to the applied hoop stress.

The above object is achieved by using a polypropylene composition comprised of a propylene copolymer which comprises
73.0-99.0 wt % of propylene and
1 to 20 wt % of one or more $C_4$-$C_8$ α-olefins and/or up to 7 wt % of ethylene, where the propylene copolymer is at least partially crystallized in the β-modification, for the production of pressure pipes whose failure time vs. hoop stress relation at 95° C. before a knee-point fits the following type of equation:

LOG (hoop stress)=(slope)*LOG(failure time)+(constant), where (slope)≧−0.0300 when the failure is ductile and where the testing is performed according to ISO 1167:1996(E).

All known polypropylene pipes which are state of the art exhibit a remarkably steeper slope, i.e. more negative (slope)-values, in the region of ductile failure when they are tested according to the above conditions.

In the above equation the item (constant) is dependent upon the chemical composition of the tested polymer, e.g. whether it is a homo- or copolymer. The value of (constant) alone does not give any indication about the pressure resistance properties of a pipe.

It is a still further object of the present invention to provide polypropylene pressure pipes with an increased long-term pressure resistance, i.e. a delayed occurrence of a knee-point in their failure time vs. hoop stress relation.

The above object is solved by using a polypropylene composition comprised of a propylene copolymer which comprises
73.0-99.0 wt % of propylene and
1 to 20 wt % of one or more $C_4$-$C_8$ α-olefins and/or up to 7 wt % of ethylene, where the propylene copolymer is at least partially crystallized in the β-modification, for the production of pressure pipes whose failure time vs. hoop stress relation at 95° C. before a knee-point fits the following type of equation:

LOG(hoop stress)=(slope)*LOG(failure time)+(constant)

and where a knee-point does not occur before 1500 hrs of testing according to ISO 1167:1996(E).

All known polypropylene random copolymer pipes which are state of the art have a knee-point of no longer than 1500 hrs, when pressure testing at 95° C. according to ISO 1167: 1996(E). At the date of filing this application (November 2001) only ductile failures and no non-ductile failures have been observed at 95° C. and 70° C. with pipes according to the invention, with some pipes having already been tested for more than 10.000 hrs. Consequently, no knee-point has been observed.

According to an embodiment of the present invention the propylene copolymer comprises
90.0-94.0 wt % of propylene and
6 to 10 wt % of 1-butene, where (slope)≧−0.0250.

Pressure pipes from the above compositions of propylene/1-butene copolymers have a very flat slope in their ductile failure region.

According to a further embodiment of the present invention the propylene copolymer comprises 89.4-95.9 wt % of propylene and
4 to 10 wt % of 1-butene and
0.1 to 0.6 wt % of ethylene, where (slope)≧"0.0250.

Pressure pipes from compositions comprising terpolymers of propylene, 1-butene and small amounts of ethylene also have very favourable flat slopes in their ductile failure region.

According to a still further embodiment of the present invention the propylene copolymer comprises 95-97 wt % of propylene and
3 to 5 wt % of ethylene where (slope)≧−0.0220.

Pressure pipes from the above compostions comprising propylene/ethylene copolymers also have very favourable flat slopes in their ductile failure region.

Definition of β-Nucleating Agent

As β-nucleating agent any nucleating agent can be used which is suitable for inducing crystallization of polypropylene homo- and copolymers in the hexagonal or pseudohexagonal modification. Mixtures of such nucleating agents may also be employed.

Suitable types of 13-nucleating agents are dicarboxylic acid derivative type diamide compounds from $C_5$-$C_8$-cycloalkyl monoamines or $C_6$-$C_{12}$-aromatic monoamines and $C_5$-$C_8$-aliphatic, $C_5$-$C_8$-cycloaliphatic or $C_6$-$C_{12}$-aromatic dicarboxylic acids, e.g.

N,N'-di-$C_5$-$C_8$-cycloalkyl-2,6-naphthalene dicarboxamide compounds such as N,N'-dicyclohexyl-2,6-naphthalene dicarboxamide and N,N'-dicyclooctyl-2,6-naphthalene dicarboxamide, N,N'-di-$C_5$-$C_8$-cycloalkyl-4,4-biphenyidicarboxamide compounds such as N,N'-dicyclohexyl-4,4-biphenyidicarboxamide and N,N'-dicyclopentyl-4,4-biphenyldicarboxamide, N,N'-di-$C_5$-$C_8$-cycloalkyl-terephthalamide compounds such as N,N'-dicyclohexylterephthalamide and N,N'-dicyclopentylterephthalamide, N,N'-di-$C_5$-$C_8$-cycloalkyl-1,4-cyclohexanedicarboxamide compounds such as N,N'-dicyclo-hexyl-1,4-cyclohexanedicarboxamide and N,N'-dicyclohexyl-1,4-cyclopentanedicarboxamide, diamine derivative type diamide compounds from $C_5$-$C_8$-cycloalkyl monocarboxylic acids or $C_6$-$C_{12}$-aromatic monocarboxylic acids and $C_5$-$C_8$-cycloaliphatic or $C_6$-$C_{12}$-aromatic diamines, e.g.

N,N'-$C_6$-$C_{12}$-arylene-bis-benzamide compounds such as N,N'-p-phenylene-bis-benzamide and N,N'-1,5-naphthalene-bis-benzamide, N,N'-$C_5$-$C_8$-cycloalkyl-bis-benzamide compounds such as N,N'-1,4-cyclopentane-bis-benzamide and N,N'-1,4-cyclohexane-bis-benzamide, N,N'-p-$C_6$-$C_{12}$-arylene-bis-$C_5$-$C_8$-cycloalkylcarboxamide compounds such as N,N'-1,5-naphthalene-bis-cyclohexanecarboxamide and N,N'-1,4-phenylene-bis-cyclohexanecarboxamide, and N,N'-$C_5$-$C_8$-cycloalkyl-bis-cyclohexanecarboxamide compounds such as N,N'-1,4-cyclopentane-bis-cyclohexanecarboxamide and N,N'-1,4-cyclohexane-bis-cyclohexanecarboxamide, amino acid derivative type diamide compounds from amidation reaction of $C_5$-$C_8$-alkyl, $C_5$-$C_8$-cycloalkyl- or $C_6$-$C_{12}$-arylamino acids, $C_5$-$C_8$-alkyl-, $C_5$-$C_8$-cycloalkyl- or $C_6$-$C_{12}$-aromatic monocarboxylic acid chlorides and $C_5$-$C_8$-alkyl-, $C_5$-$C_8$-cycloalkyl- or $C_6$-$C_{12}$-aromatic mono-amines, e.g.

N-phenyl-5-(N-benzoylamino)pentaneamide and N-cyclohexyl-4-(N-cyclohexyl-carbonylamino)benzamide.

Further suitable β-nucleating agents are quinacridone type compounds, e.g. quinacridone, dimethylquinacridone and dimethoxyquinacridone, quinacridonequinone type compounds, e.g. quinacridonequinone, a mixed crystal of 5,12-dihydro(2,3b)acridine-7,14-dione with quino(2,3b)acridine-6,7,13,1 4-(5H,1 2H)-tetrone and dimethoxyquinacridonequinone and dihydroquinacridone type compounds, e.g. dihydroquinacridone, dimethoxydihydroquinacridone and dibenzodihydroquinacridone.

Still further suitable β-nucleating agents are dicarboxylic acid salts of metals from group IIa of periodic system, e.g. pimelic acid calcium salt and suberic acid calcium salt; and mixtures of dicarboxylic acids and salts of metals from group IIa of periodic system.

Still further suitable β-nucleating agents are salts of metals from group IIa of periodic system and imido acids of the formula wherein x=1 to 4; R=H, —COOH, $C_1$-$C_{12}$-alkyl, $C_5$-$C_8$-cycloalkyl or $C_6$-$C_{12}$-aryl, and Y =$C_1$-$C_{12}$-alkyl, $C_5$-$C_8$-cycloalkyl or $C6$-$C_{12}$-aryl-substituted bivalent $C_6$-$C_{12}$-aromatic residues, e.g.

calcium salts of phthaloylglycine, hexahydrophthaloylglycine, N-phthaloylalanine and/or N4-methylphthaloylglycine.

Preferred β-nucleating agents are any one or mixtures of N,N'-dicyclohexyl-2,6-naphthalene dicarboxamide, the β-nucleating agents of EP 177961 and those of EP 682066.

The propylene copolymer which is at least partly crystallized in the β-modification is preferably produced by melt mixing the propylene copolymer base resin with 0.0001 to 2.0 wt % based on the propylene copolymer used, of β-nucleating agents at temperatures from 175 to 250° C. and cooling and crystallizing the melt according to procedures which are state of the art.

Definition of Pipe

The term "pipe" as used herein is meant to encompass pipes in the narrower sense, as well as supplementary parts like fittings, valves and all parts which are commonly necessary for e.g. a hot water piping system.

Pipes according to the invention also encompass single and multilayer pipes, where for example one or more of the layers is a metal layer and which may include an adhesive layer. Other constructions of pipes, e.g. corrugated pipes, are possible as well.

The propylene compositions used for pipes according to the invention may contain usual auxiliary materials, e.g. up to 40 wt % fillers and/or 0.01 to 2.5 wt % stabilizers and/or 0.01 to 1 wt % processing aids and/or 0.1 to 1 wt % antistatic agents and/or 0.2 to 3 wt % pigments and/or reinforcing agents, e.g. glass fibres, in each case based on the propylene composition used.

For the present invention coloration of the propylene composition is largely irrelevant, however certain pigments, e.g. pigments which are highly active a-nucleating agents, cannot be utilised.

Production of the Pipes

Pipes according to the invention were produced by first plasticizing the propylene polymer in an extruder at temperatures in the range of from 200 to 250° C. and then extruding it through an annular die and cooling it.

The extruders for producing the pipes can be single screw extruders with an LID of 20 to 40 or twin screw extruders or extruder cascades of homogenizing extruders (single screw or twin screw). Optionally, a melt pump and/or a static mixer can be used additionally between the extruder and the ring die head. Ring shaped dies with diameters ranging from approximately 16 to 2000 mm and even grater are possible.

The melt arriving from the extruder is first distributed over an annular cross-section via conically arranged holes and then fed to the core/die combination via a coil distributor or screen. If necessary, restrictor rings or other structural elements for ensuring uniform melt flow may additionally be installed before the die outlet.

After leaving the annular die, the pipe is taken off over a calibrating mandrel, usually accompanied by cooling of the pipe by air cooling and/or water cooling, optionally also with inner water cooling.

Experimental Part—Preparation of the Polymer Compositions

Base Resin I

The Propene-1-butene-copolymer was polymerized in a continuous working polymerization system by using propene, 1-butene, the catalyst compound C and cocatalysts (Triethylaluminium (TEAI), Electron donor (CMDMS)).

Catalyst Compound C

As catalyst compound C a commercial available Ziegler/Natta-catalyst (Titaniumchloride catalyst supported on $MgCl_2$), suitable for the production of polypropylene-copolymers in a monomer suspension is used.

Polymerization

The polymerization is performed continuously in a prepolymerization reactor and a main polymerization reactor. Temperatures, pressures, catalyst-, monomer- and hydrogen feed in the separate polymerization steps as well as the polymer concentration in the main reactor are kept constant. The molar mass of the copolymer is controlled by adding hydrogen gas. The concentration of hydrogen in the mixture of liquid monomers is continuously measured by gas chromatography. The relevant processing parameters and the analytical results of the resulting polymer are listed in table 1.

The first polymerization step is performed in a small reactor (equipped with stirrer and cooling system), where an excess of a liquid mixture of the monomers propene and 1-butene is prepolymerized for 9 minutes at 20° C. Therefore catalyst compound C, mixed with the cocatalyst compounds Triethylaluminium (TEAI) and Cyclohexyl-methyl-dimethoxysilane (CMDMS) as external electron donor, are continuously poured into the prepolymerization unit.

The prepolymer (product A) is continuously removed from the prepolymerization unit and passed over into the main reactor system (equipped with stirrer and cooling system), where under excess of a liquid mixture of the monomers propene and 1-butene, the final copolymer (B) is formed. Further a mixture of monomers (propene/1-butene) and hydrogen (for molar mass control) are continuously fed into the main reactor. The polymer concentration is kept constant at 517 g/l. A part of the reactor content (polymer-/monomer excess) is continuously removed from the reactor into a degassing unit to separate the formed copolymer (B) from unreacted monomer mixture by evaporation.

The separated copolymer (B), Base resin I was subjected to a steam treatment, to remove the unreacted monomers and volatile substances, and then dried.

Base Resin II

The Propene-1-butene-copolymer was polymerized in a continuous working polymerization system by using propene, 1-butene, the catalyst compound F and cocatalysts (Triethylaluminium (TEAI), Electron donor (DCPDMS)).

Catalyst Compound F

As catalyst compound F a commercial available Ziegler/Natta-catalyst (Titaniumchloride catalyst supported on $MgCl_2$), suitable for the production of polypropylene-copolymers in a monomer suspension is used.

Polymerization

The polymerization is performed continuously in a prepolymerization reactor and a main polymerization reactor. Temperatures, pressures, catalyst-, monomer- and hydrogen feed in the separate polymerization steps as well as the polymer concentration in the main reactor are kept constant. The molar mass of the copolymer is controlled by adding hydrogen gas. The concentration of hydrogen in the mixture of liquid monomers is continuously measured by gas chromatography. The relevant processing parameters and the analytical results of the resulting polymer are listed in table 1.

The first polymerization step is performed in a small reactor (equipped with stirrer and cooling system), where an excess of propene and 1-butene is prepolymerized for 9 minutes at 20° C. Catalyst compound F, mixed with the cocatalyst compounds Triethylaluminium (TEAI) and Dicyclopentyl-dimethoxysilan (DCPDMS) as external electron donor, are continuously poured into the prepolymerization unit.

The prepolymer (product D) is continuously removed from the prepolymerization unit and passed over into the main reactor system (equipped with stirrer and cooling system), where under excess of a liquid mixture of the monomers propene and 1-butene, the final copolymer (E) is formed. Further a mixture of monomers (propene/ethene) and hydrogen (for molar mass control) are continuously fed into the main reactor. The polymer concentration is kept constant at 513 g/l. A part of the reactor content (polymer-/monomer excess) is continuously removed from the reactor into a degassing unit to separate the formed copolymer (E) from unreacted monomer mixture by evaporation.

The separated copolymer (E), Base resin II was subjected to a steam treatment, to remove the unreacted monomers and volatile substances, and then dried Base Resin III The Propene-ethene-1-butene-terpolymer was polymerized in a continuous working polymerization system by using propene, ethene, 1-butene, the catalyst compound J and cocatalysts (Triethylaluminium (TEAI), Electron donor (CMDMS)).

Catalyst Compound J

As catalyst compound J a commercial available Ziegler/Natta-catalyst (Titaniumchloride catalyst supported on MgCl$_2$), suitable for the production of polypropylene terpolymers in a monomer suspension is used.

Polymerization

The polymerization is performed continuously in a prepolymerization reactor and a main polymerization reactor. Temperatures, pressures, catalyst-, monomer- and hydrogen feed in the separate polymerization steps as well as the polymer concentration in the main reactor are kept constant. The molar mass of the terpolymer is controlled by adding hydrogen gas. The concentration of hydrogen in the mixture of liquid monomers is continuously measured by gas chromatography. The relevant processing parameters and the analytical results of the resulting polymer are listed in tables 1 and 2.

The first polymerization step is performed in a small reactor (equipped with stirrer and cooling system), where an excess of a liquid mixture of the monomers propene and 1-butene is prepolymerized for 9 minutes at 20° C. Therefore catalyst compound J mixed with the cocatalyst compounds Triethylaluminium (TEAl) and Cyclohexyl-methyldimethoxysilane (CMDMS) as external electron donor, are continuously poured into the prepolymerization unit.

The prepolymer (product K) is continuously removed from the prepolymerization unit and passed over into the main reactor system (equipped with stirrer and cooling system), where under excess of a liquid mixture of the monomers propene and 1-butene, under addition of ethene, the final terpolymer (L) is formed. Further a mixture of monomers (propene/1-butene/ethene) and hydrogen (for molar mass control) are continuously fed into the main reactor. The polymer concentration is kept constant at 542 g/l. A part of the reactor content (polymer-/monomer excess) continuously is removed from the reactor into a degassing unit to separate the formed terpolymer (L) from unreacted monomer mixture by evaporation.

The separated terpolymer (L), Base resin III, was subjected to a steam treatment, to remove the unreacted monomers and volatile substances, and then dried.

TABLE 1

| | | Base resins | | |
|---|---|---|---|---|
| Parameter | unit | I | II | III |
| Catalyst system and concentration | | | | |
| TEAL/CMDMS | g/g | 4.85 | — | 4.85 |
| TEAl/DCPDMS | g/g | — | 4.85 | — |
| TEAl/Ti | g/g | 218 | 315 | 317 |
| TEAl/Ti | mol/mol | 91 | 132 | 133 |
| Prepolymerization reactor/Liquid monomer phase | | | | |
| Catalyst compound | — | C | F | J |
| Feed catalyst compound | g/h | 4.04 | 2.78 | 3.18 |
| Pressure | bar | 34 | 34 | 34 |
| Temperature | ° C. | 20 | 20 | 20 |
| mean residence time | min | 9 | 9 | 9 |
| Main reactor/Liquid monomer phase | | | | |
| Pressure | bar | 34 | 34 | 34 |
| Temperature | ° C. | 65 | 65 | 65 |
| Average residence time catalyst | min | 1.48 | 1.46 | 1.50 |
| Polymer concentration in reactor (stationary) | g/l | 517 | 513 | 542 |
| Feed propylen/1-butene mixture | kg/h | 130 | 130 | 134 |
| Butene content in monomer feed | Vol % | 12.5 | 13.0 | 22.0 |
| Ethylene feed | kg/h | — | — | 0.8 |
| H2-concentration based on monomer feed | ppm | 95 | 210 | 110 |
| Polymer production rate final product | kg/h | 41.0 | 30.0 | 49.5 |
| Final product | — | B | E | K |

TABLE 1-continued

| | | Base resins | | |
|---|---|---|---|---|
| Parameter | unit | I | II | III |
| Catalyst system and concentration | | | | |
| Analytical results | | | | |
| MFR (230°/2.16 kp) | g/10 min | 0.27 | 0.41 | 0.32 |
| Ethylene content in copolymer | wt % | 0 | 0 | 0.6 |
| Butene content in copolymer | wt % | 6.2 | 6.6 | 6.1 |
| Xylene cold solubles | wt-% | 3.8 | 2.7 | 4.1 |
| Melting temperature | ° C. | 145 | 142 | 142 |

EXAMPLE 1 (INVENTION)

The Propene-1-butene-copolymer powder (Base resin I) was mixed with 0.07% Calciumstearate, 0.25% Pentaerythritol-tetrakis(3,5-di-tert-butyl-4-hydroxyphenyl)propionate, 0.1% Tris(2,4-ditert-butylphenyl)phosphite, 0.25% 3,3',3',5, 5',5'-hexa-tert-butyl-a,a',a'-(mesitylene-2,4,6-triyl)tri-p-cresol and 2% Masterbatch A and pelletized in a conventional compounding line.

EXAMPLE 2 (INVENTION)

The Propene-1-butene-copolymer powder (Base resin II) was mixed with 0.07% Calciumstearate, 0.25% Pentaerythritol-tetrakis(3,5-di-tert-butyl-4-hydroxyphenyl)propionate, 0.1% Tris(2,4-ditert-butylphenyl)phosphite, 0.25% 3,3',3',5, 5',5'-hexa-tert-butyl-a,a',a'-(mesitylene-2,4,6-triyl)tri-p-cresol and 2% Masterbatch A and pelletized in a conventional compounding line.

EXAMPLE 3 (INVENTION)

The Propene-ethene-1-butene-terpolymer powder (Base resin III) was mixed with 0.07% Calciumstearate, 0.25% Pentaerythritol-tetrakis(3,5-di-tert-butyl-4-hydroxyphenyl) propionate, 0.1% Tris(2,4-ditert-butylphenyl)phosphite, 0.25% 3,3',3',5,5',5'-hexa-tert-butyl-a,a',a'-(mesitylene-2,4, 6-triyl)tri-p-cresol and 2% Masterbatch A and pelletized in a conventional compounding line.

EXAMPLE 4 (INVENTION)

The Propene-ethene-1-butene-terpolymer powder (Base resin III) was mixed with 0.07% Calciumstearate, 0.25% Pentaerythritol-tetrakis(3,5-di-tert-butyl-4-hydroxyphenyl) propionate, 0.1% Tris(2,4-ditert-butylphenyl)phosphite, 0.25% 3,3',3',5,5',5'-hexa-tert-butyl-a,a',a'-(mesitylene-2,4, 6-triyl)tri-p-cresol and 0.1% Calciumpimelate and pelletized in a conventional compounding line.

EXAMPLE 5 (INVENTION)

The commercially available Propene-ethene-copolymer Borealis RA130E was mixed with 0.5% Dioctadecyl 3,3'-thiodipropionate and 2% Masterbatch A and pelletized in a conventional compounding line.

COMPARATIVE EXAMPLE 1

The Propene-1-butene-copolymer powder (Base resin I) was mixed with 0.07% Calciumstearate, 0.25% Pentaerythritol-tetrakis(3,5-di-tert-butyl-4-hydroxyphenyl)propionate, 0.1% Tris(2,4-ditert-butylphenyl)phosphite, 0.25% 3,3',3',5, 5',5'-hexa-tert-butyl-a,a',a'-(mesitylene-2,4,6-triyl)tri-p-cresol and pelletized in a conventional compounding line.

COMPARATIVE EXAMPLE 2

The Propene-1-butene-copolymer powder (Base resin II) was mixed with 0.07% Calciumstearate, 0.25% Pentaerythritol-tetrakis(3,5-di-tert-butyl-4-hydroxyphenyl)propionate, 0.1% Tris(2,4-ditert-butylphenyl)phosphite, 0.25% 3,3',3',5,5',5'-hexa-tert-butyl-a,a',a'-(mesitylene-2,4,6-triyl)tri-p-cresol and pelletized in a conventional compounding line.

COMPARATIVE EXAMPLE 3

The Propene-ethene-1-butene-terpolymer powder (Base resin III) was mixed with 0.07% Calciumstearate, 0.25% Pentaerythritol-tetrakis(3,5-di-tert-butyl-4-hydroxyphenyl)propionate, 0.1% Tris(2,4-ditert-butylphenyl)phosphite, 0.25% 3,3',3',5,5',5'-hexa-tert-butyl-a,a',a'-(mesitylene-2,4,6-triyl)tri-p-cresol and pelletized in a conventional compounding line.

COMPARATIVE EXAMPLE 4

As comparative example 4 a commercially available propene-ethene-copolymer grade (Borealis RA 130E) was used.

COMPARATIVE EXAMPLE 5

As comparative example 5 a commercial available propene-homopolymer grade (Borealis BE60-7032) was used.

Masterbatch A

Masterbatch A is a commercially available product based on polypropylene and containing the quinacridone pigment "Chinquasia gold" as β-nucleating agent.

| Composition of Masterbatch A: | |
|---|---|
| 49.75% | Polypropylene |
| 0.25% | Quinacridone Pigment Orange 48 |
| 2% | Carbon Black Pigment Black 7 |
| 4% | Cr/Sb/Ti oxide Pigment Brown 24 |
| 1% | Chromium oxide Pigment Green 17 |
| 1% | Ni/Sb/Ti oxide Pigment Yellow 53 |
| 42% | $TiO_2$ Pigment White 6 |

Calciumpimelate

1 Mol of pimelic acid was reacted with 1 mol calciumcarbonate in a mixture of ethanol and water at 60-80° C. The produced calciumpimelate was filtered and dried.

Description of Measurement Methods

Determination of β-Crystallinity

The β-crystallinity was determined by Differential Scanning Calorimetry (DSC). DSC was run according to ISO 3146/part 3/method C2 with a scan rate of 10° C./min. The amount of β-modification was calculated from the second heat by the following formula:

$$\beta\text{-area}/(\alpha\text{-area} + \beta p\text{-area})$$

Since the thermodynamical instable β-modification starts to be changed into the more stable a-modification at temperatures above 150° C., a part of the β-modification is transferred within the heating process of DSC-measurement. Therefore the amount of β-PP determined by DSC is lower as when measured according to the method of Turner-Jones by WAXS (A. Turner-Jones et. al., Makromol. Chem 75 (1964) 134).

"Second heat" means, that the sample is heated according to ISO 3146/part 3/method C2 for a first time and then cooled to room temperature at a rate of 20° C./min. The sample is then heated a second time, also according to ISO 3146/part 3/method C2. This second heat is relevant for measurement and calculation.

During the "first heat" all thermal history of the sample giving rise to different crystalline structure, which typically comes from different processing conditions and/or methods, is destroyed. Using the second heat for determination of β-crystallinity, it is possible to compare samples regardless of the way the samples were originally manufactured.

XCS

Xylene solubles were determined at 23° C. according to ISO 6427. Xylene solubles are defined as the percent by weight that stays in solution after the polymer sample is dissolved in hot xylene and the solution is allowed to cool to 23° C.

MFR

The melt flow rates were measured with a load of 2.16 kg at 230° C. The melt flow rate is that quantity of polymer in grams which the test apparatus standardized to DIN 53 735 extrudes within 10 minutes at a temperature of 230° C. under a weight of 2.16 kg.

Flexural Test

The flexural test was carried out according to the method of ISO 178 by using injection molded test specimens as described in EN ISO 1873-2 (80×10×4 mm).

Charpy Impact Strength

The notched charpy impact strength was carried out according to ISO 179/1 eA at 23° C. by using injection molded test specimens as described in EN ISO 1873-2 (80×10×4 mm)

Hoop Stress Test

Hoop stress tests are performed according to ISO 1167: 1996(E). For a better comparability and also for practical reasons (availability of data) only the data at 95° C. are used in this application.

TABLE 2

| | | Data of basic polymer | | | | | | | | |
|---|---|---|---|---|---|---|---|---|---|---|
| Base resin | | BE60 | RA130E | | Base resin I | | Base resin II | | Base resin III | |
| Example | | CE 5 | CE 4 | E 5 | CE 1 | E 1 | CE 2 | E 2 | CE 3 | E 3 | E 4 |
| Comment | | | C2-raco | | C4-raco | | C4-raco | | | C2C3C4-raco | |
| Nucleation | | β | α | β | α | β | α | β | α | β | β |
| | | | | | β-nucleating agent | | | | | | |
| Masterbatch A | ppm | 12000 | 12000 | | 20000 | | 20000 | | 20000 | | |
| Calciumpimelate | ppm | | | | | | | | | | 1000 |

TABLE 2-continued

Analytical & mechanical results

| | | | | | | | | | | | | |
|---|---|---|---|---|---|---|---|---|---|---|---|---|
| MFR | 230/2.16 | g/10' | 0.3 | 0.19 | 0.20 | 0.21 | 0.25 | 0.31 | 0.35 | 0.33 | 0.35 | 0.35 |
| DSC | Tm | °C. | 152 | 143 | 132 | 143 | 135 | 143 | 134 | 140 | 131 | 133 |
| | | | 168 | | 146 | | 149 | | 148 | | 144 | 145 |
| | Hm | J/g | 90 | 81 | 62 | 80 | 67 | 92 | 69 | 78 | 63 | 66 |
| | | | 21 | | 16 | | 12 | | 12 | | 12 | 15 |
| | Tc | °C. | 124 | 103 | 109 | 102 | 108 | 98 | 106 | 99 | 104 | 105 |
| β-nucleation | (DSC) | % | 81 | | 80 | | 84 | | 85 | | 84 | 81 |
| IR | ethylene | wt % | | 4.2 | 4.2 | | | | | 0.6 | 0.6 | 0.6 |
| | 1-butene | wt % | | | | 8.3 | 8.3 | 8.6 | 8.6 | 8.2 | 8.2 | 8.2 |
| Extraction | XCS | % | 2.3 | 6.9 | 7.5 | 3.1 | 2.1 | 2.2 | 2.8 | 3.2 | 3.4 | 2.9 |
| Iso 179 notched | +23° C. | kJ/m$^2$ | 85 | 18 | 90 | 12 | 82 | 9 | 74 | 11 | 84 | 76 |
| Flex test | Flex Mod | MPa | 1215 | 828 | 740 | 972 | 959 | 1051 | 998 | 949 | 902 | 888 |

Failure times [h]/Failure mode

| | | | | | | | | | | | |
|---|---|---|---|---|---|---|---|---|---|---|---|
| hoop stress at 95° C. | 3.5 MPa | 7845/nD | 7663/nD | 6298/D | 13000 ip | 13000 ip | 4323/nD | 13000 ip | 12000 ip | 12000 ip | 12000 ip |
| | 3.8 MPa | 6946/nD | 3020/nD | 59/D | 7185/nD | 5885/D | | 10558/D | 6712/nD | 5269/D | 5317/D |
| | 4.0 MPa | 6511/nD | 2264/nD | 7/D | | 248/D | | 1301/D | | 199/D | 204/D |
| | 4.2 MPa | | 1079/nD | | 2855/nD | 49/D | 2860/nD | 71/D | 2499/nD | 37/D | 36/D |
| | 4.5 MPa | 2769/nD | 684/nD | | 1151/nD | 6/D | 866/nD | 8/D | 1022/nD | 6/D | 5/D |
| | 4.9 MPa | | 220/D | | | | | | | | |
| | 5.0 MPa | 1939/nD | 120/D | | | | | | | | |
| | 5.1 MPa | | 80/D | | | | | | | | |
| | 5.2 MPa | | 44/D | | | | | | | | |
| | 5.5 MPa | 726/D | | | | | | | | | |
| | 6.0 MPa | 58/D | | | | | | | | | |

Failure modes:
D . . . ductile failure
nD . . . non-ductile failure
ip . . . testing in progress, no failure until specified time.

Comparative examples CE4 and CE5 show both ductile and non-ductile failures at 95° C. A regression line through the non-ductile failure points, when put into a log/log diagram as explained earlier, is steeper than one through the ductile failure points (for each example), when put into a log/log diagram. Therefore all of the comparative examples CE4 and CE5 display a knee-point. On the other hand, examples E1-E4 according to the invention do not show any non-ductile failure points, all failure points, including the "ip—in progress" pipes lay on a straight line. Testing is under way for more than one year (i.e. 12000 and 13000 hours) and only ductile failure points can be used of extrapolation in order to get the extrapolated life time at 50° C.

The longest knee-points at 95° C. for present art are at the following times: CE1<1151 h (nD); CE2≦866 h (nD); CE3≦1022 h (nD); CE4: between 220 h (D) and 684 h (nD); CE5: between 726 h (D) and 1939 h (nD).

The examples according to the invention (E1 to E4) do not show knee-points at times >5885 h (D) for E1; >10558 h (D) for E2; >5269 h (D) for E3 and >5217 h (D) for E4 and at times of >12000 h and >13000 h all pipes are still in progress. Only one straight line is present for E1 to E4, thus higher stress levels will be achieved when extrapolated to lower temperatures to 10 to 50 years.

Comparing the slopes of CE1 to CE5 it is evident that they are steeper than the slopes of E1 to E4 in their ductile region.

E3 and E4, two beta-nucleated ethene-propene-butene terpolymers, show, when compared to CE3, a non beta-nucleated terpolymer of the same base resin, that the same phenomena like much prolonged or non-present knee-point and flatter ductile line also hold for ethene-propene-butene terpolymers.

E1 and E2, two beta-nucleated propene-butene copolymers, show, when compared to CE1 and CE2, non beta-nucleated propene-butene copolymers of the same base resin, that the same phenomena like much prolonged or non-present knee-point and flatter ductile line also hold for propene-butene copolymers.

E5, a beta-nucleated ethene-propene copolymer, show, when compared to CE4, a non beta-nucleated ethene-propene copolymer of the same base resin, that the same phenomena like much prolonged or non-present knee-point and flatter ductile line also hold for ethene-propene copolymers.

Figure 1:
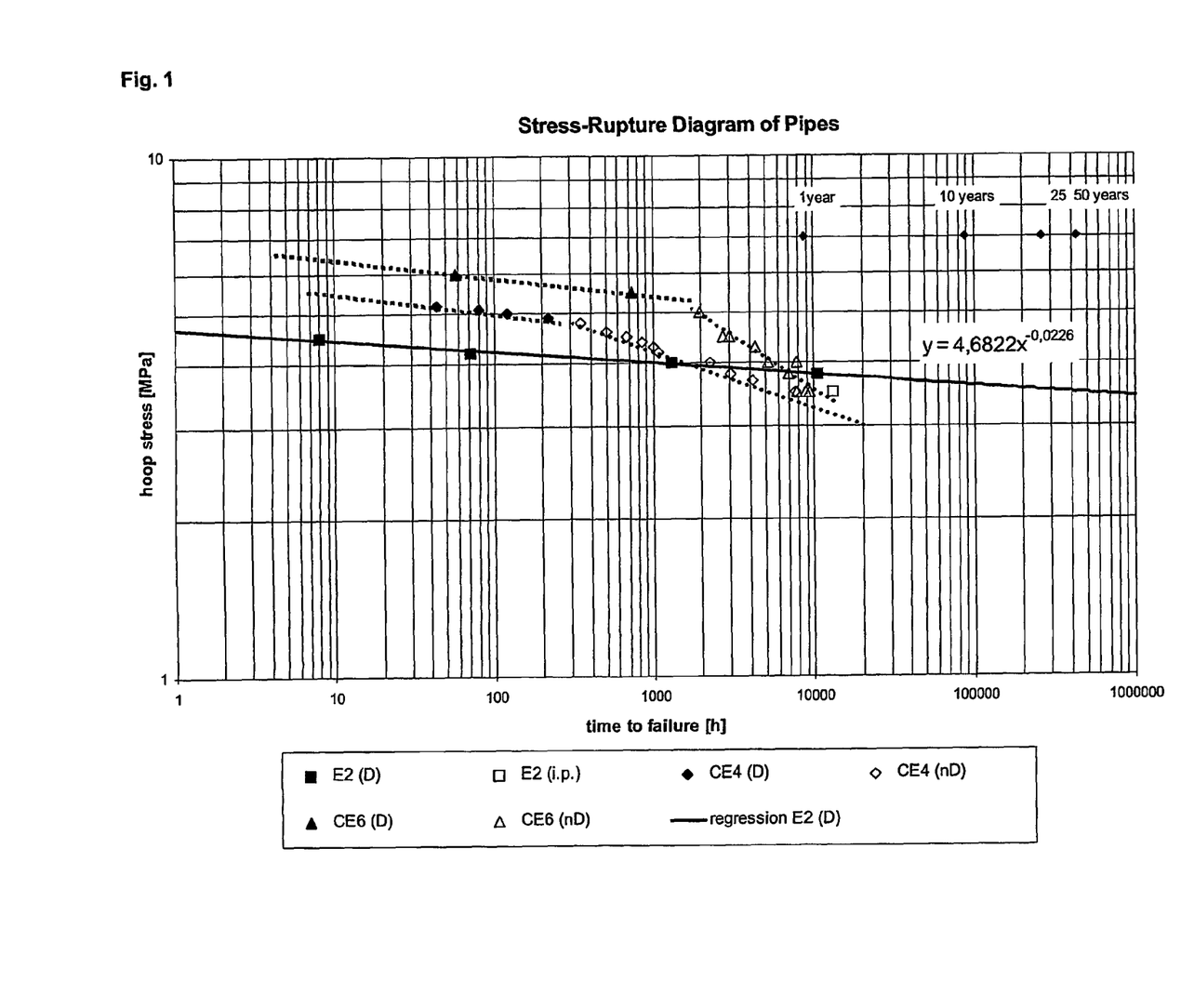

The diagram in FIG. 1 is a log/log representation of comparative examples CE4 and CE5 and of inventive example E2. The lines which are drawn through the data points of CE4 and CE5 are drawn by hand. It is however clearly visible, that for each set of data—with the exception of E2—a distinctive knee-point is present at the intersection of the respective ductile and non-ductile regression lines. It is also clearly visible that the slopes of the regression lines of CE4 and CE5 in their ductile region is steeper than the slope of the regression line of E2. The number of data points in the non-ductile region of CE4 and CE5 is different from the number of data presented in table 2. This does however not change the time of occurrence of a knee-point or the slope of the regression line in the ductile region.

The regression line through the data points of ductile failure of E2 is exactly calculated and the equation of the regression line (which is actually a polynomial regression curve, which appears as a straight line in the double logarithmic representation) is included in FIG. 1. The exponent in the equation is what is referred to herein as (slope).

The single data point which is denoted as E2 (i.p.), which means that the pipe is still under testing, is not included in the regression analysis. This data point will slowly continue to move to the right of the diagram as time progresses and it will either be the first non-ductile failure point of this data series (after more than 13000 hours !) or a still further ductile failure point.

The invention claimed is:

1. A pressure pipe having increased long-term pressure resistance fabricated of a polypropylene composition comprising a random terpolymer of:
   89.0-96.0 wt % propylene,
   3 to 10 wt % of a $C_4$-$C_8$ α-olefin, and up to
   1 wt % ethylene,
   wherein the random terpolymer is at least partially crystallized in the β-modification.

2. The pressure pipe of claim 1 wherein the $C_4$-$C_8$ α-olefin is butene-1.

3. The pressure pipe according to claim 1 wherein the polypropylene composition has an MFR of 0.1 to 10 g/10 min at 230° C./2.16 kg.

4. The pressure pipe according to claim 1 wherein the amount of β-crystallinity of the random terpolymer, determined by DSC using the second heat, is at least 50%.

5. The pressure pipe according to claim 1 wherein the random terpolymer comprises a β-nucleating agent.

6. The pressure pipe according to claim 5, wherein
   the β-nucleating agent comprises at least one selected from the group consisting of a mixed crystal of 5,12-dihydro-quino(2,3-b)acridine-7,14-dione with quino(2,3-b)acridine6,7,13,14(5H, 12H)-tetrone, N,N'-dicyclohexyl-2,6-naphtalen dicarboxamide and dicarboxylic acid salts of metals of group II of the periodic table, and
   dicarboxylic acids of said dicarboxylic acid salts contain at least 7 carbon atoms.

7. The pressure pipe according to claim 1 wherein the $C_4$-$C_8$ α-olefin is comprised of
   3 to 10 wt % of butene.

8. The pressure pipe according to of claim 1 wherein the random terpolymer comprises:
   90.0-94.0 wt % of propylene, and
   6 to 10 wt % of 1-butene, the pressure pipe having failure time vs. hoop stress relation at 95° C. before a knee-point which fits the following equation:

LOG(hoop stress)=(slope)*LOG(failure time)+(constant), where (slope)≧−0.0250 when the failure is ductile and where the testing is performed according to ISO 1167: 1996(E).

9. The pressure pipe according to claim 1 wherein the random terpolymer comprises:
   89.4-95.9 wt % of propylene,
   4 to 10 wt % of 1-butene, and
   0.1 to 0.6 wt % of ethylene, the pressure pipe having failure time vs. hoop stress relation at 95° C. before a knee-point which fits the following equation:

LOG(hoop stress)=(slope)*LOG(failure time)+(constant), where (slope)≧−0.0250 when the failure is ductile and where the testing is performed according to ISO 1167: 1996(E).

10. The pressure pipe according to claim 1 wherein the random terpolymer comprises:
    95-97 wt % of propylene, and
    3 to 5 wt % of ethylene, the pressure pipe having failure time vs. hoop stress relation at 95° C. before a knee point which fits the following equation:

LOG(hoop stress)=(slope)*LOG (failure time)+(constant), where (slope)≧−0.0250 when the failure is ductile and where the testing is performed according to ISO 1167: 1996(E).

11. Multi-layer pipe where at least one of the layers comprises a pressure pipe according to claim 1.

12. The pressure pipe according to claim 1, wherein said pressure pipe is an extruded pipe.

13. The pressure pipe according to claim 6, wherein the β-nucleating agent comprises a mixed crystal of 5,12-dihydro-quino(2,3-b)acridine-7,14-dione with quino(2,3-b)acridine6,7,13,14(5H, 12H)-tetrone.

14. Extruded pressure pipe with increased long-term pressure resistance comprised of a polypropylene composition wherein
    the polypropylene composition is comprised of a random terpolymer which comprises:
    89.0-96.0 wt % propylene,
    3 to 10 wt % of a $C_4$-$C_8$ β-olefin, and up to
    1 wt % ethylene,
    the random terpolymer is at least partially crystallized in the β-modification and the amount of β-crystallinity of the random terpolymer, determined by DSC using the second heat, is at least 50%, and
    the random terpolymer comprises a β-nucleating agent.

15. Extruded pipe according to claim 14, wherein the amount of β-crystallinity of the random terpolymer, determined by DSC using the second heat, is at least 80%.

* * * * *